A. R. TRACY.
AUTOMATIC GAS SHUT-OFF.
APPLICATION FILED DEC. 22, 1910.

1,019,201.

Patented Mar. 5, 1912.

Witnesses:
W. A. Keene
Amos Tupper

Inventor:
Arza R. Tracy

UNITED STATES PATENT OFFICE.

ARZA R. TRACY, OF PATEROS, WASHINGTON.

AUTOMATIC GAS SHUT-OFF.

1,019,201. Specification of Letters Patent. Patented Mar. 5, 1912.

Application filed December 22, 1910. Serial No. 598,876.

*To all whom it may concern:*

Be it known that I, ARZA R. TRACY, a citizen of the United States, residing at Pateros, in the county of Okanogan and State of Washington, have invented new and useful Improvements in Automatic Gas Shut-Offs, of which the following is a specification.

My invention relates to improvements in automatic gas shut offs, and has for its object the arrangement of means designed to automatically shut off the flow of gas when being used for illuminating or cooking purposes, when the blaze is accidentally or through ignorance intentionally blown out or extinguished.

With this object in view, the invention comprises certain novel constructions, combinations and arrangements of parts as will be hereinafter more fully described and claimed: I attain these objects by the mechanism illustrated in the accompanying drawings, in which—

Figure 1:
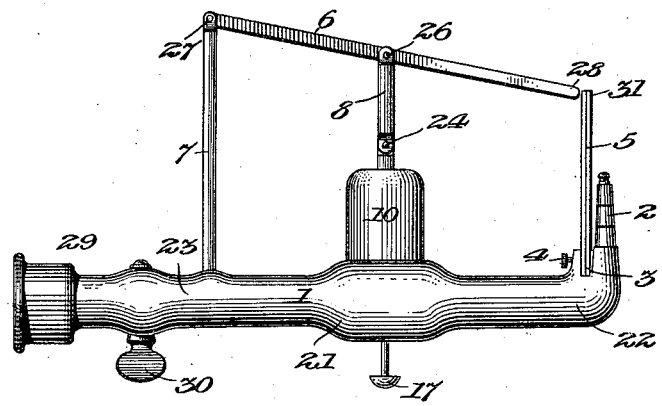
Figure 2:
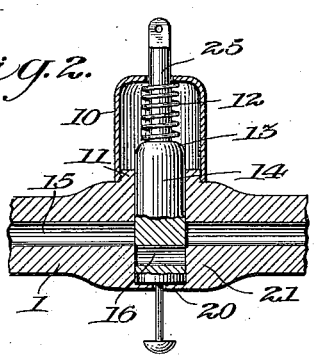
Figure 3:
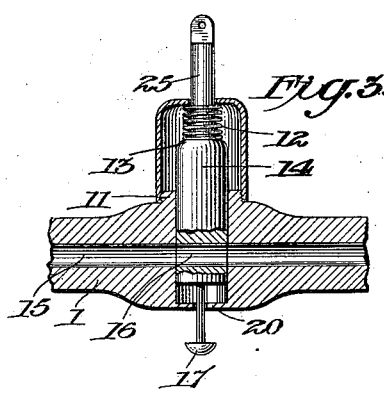
Figures 4, 5:
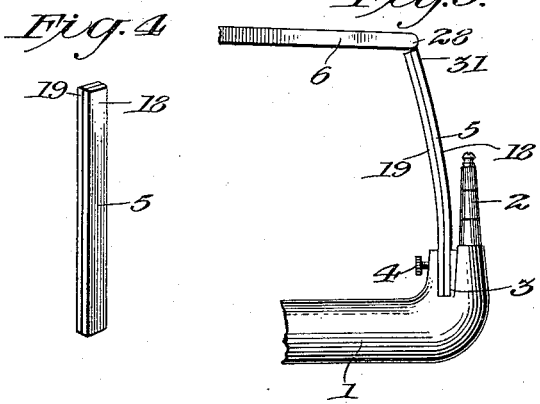
Figure 6:
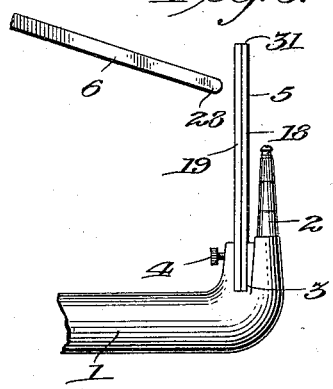

Figure 1 is a side elevation of an embodiment of the invention; Fig. 2 is a sectional view of the automatic valve showing the current shut off; Fig. 3 is a sectional view of the automatic valve showing the current turned on; Fig. 4 is a view of a portion of the apparatus composed of metals which expand and contract unequally when exposed to different degrees of temperature; Fig. 5 is a view of certain parts of the apparatus showing the manner in which the valve is held open by means of the unequal expansion and consequent bending of the arm shown in Fig. 4, and Fig. 6 is a view of the same parts showing their position when the valve has been automatically closed.

Similar figures refer to similar parts throughout the several views.

In constructing an embodiment of the invention a metal pipe of sufficient length and size to support the different parts is provided, one end of which is fitted with screw threads so that it can be screwed on to the ordinary gas service pipe, and the other end of which is provided with the ordinary gas jet. There is adjusted to this short pipe a valve and certain other apparatus designed to close this valve automatically whenever the flame is extinguished.

The novelty of my invention consists in the holding open of this valve by means of apparatus attached thereto which is kept in place while the valve is open by the use of an arm composed of two kinds of metal which when exposed to heat expand unequally, thereby causing this arm to bend and engage and hold up the apparatus connected with the automatic valve, thus keeping it open while the arm is heated, and when the blaze is extinguished the cooling of the arm by the extinguishment of the blaze and also by the escape of the current of cool gas, causes it to straighten and release the apparatus connected with the automatic valve, which by means of a spring attached thereto, closes it automatically within a space of time so short as to prevent the escape of gas in quantities sufficient to cause injury or damage.

In order that the invention may be more clearly understood an embodiment of the same is shown in the accompanying drawings, in which a simple manner of applying the principle is shown.

The pipe 1 is enlarged at 21, 22 and 23 in order to allow the attachment of the apparatus, and to permit of the construction of the automatic valve, as more particularly shown in Figs. 2 and 3. This automatic valve consists of a plunger 14 which operates in a circular opening through the pipe at the enlarged portion 21, which opening is at right angles to the length of the pipe. Through this plunger 14 is a circular opening 16 of the same size as the opening 15 lengthwise through the pipe. This plunger 14 extends from the opening through the pipe in which it operates to the arm 6 to which it is fastened at 26 with a hinge allowing it to work freely, the extension of the plunger being also joined or hinged at 24.

At the enlarged portion of the pipe surrounding the opening through which the plunger works is provided a collar 11—11, over which a cap 10 is fitted, the outer surface of the collar and the inner surface of the cap where the same come in contact being threaded so that the cap may be screwed fast to the collar. Through the top of this cap 10 at 25 is a circular opening of sufficient size to allow the upper portion of the plunger to work through it. The upper portion of the plunger 14 is made smaller than the lower portion thereof, and is constructed in such a manner as to leave a shoulder at 13. Around this upper portion of the plunger and resting upon the shoulder 13 is adjusted a spiral spring 12, which extends from the shoulder 13 to the inner surface of the top of the cap 10, and is of sufficient length and strength to force the plunger 14 down as shown in Fig. 2 until it rests upon the collar or projection 20, in which position the opening through the plunger 16 is brought below the lengthwise opening 15 through the pipe through which the gas flows, thus closing the valve.

The upper extension of the plunger 8 is attached to the arm 6 at 26, one end of this arm being hinged to the top end of the upright 7 at 27, the other end 28 being unattached. The lower end of the upright 7 is firmly fastened to the pipe at the enlarged portion 23.

The pipe 1 is provided at one end with a thread by means of which it is screwed to the ordinary gas service pipe 29, and to the other end is attached the ordinary gas jet 2. The enlarged portion of the pipe 22 is provided with a slot 3 into which the lower end of the arm 5 is placed and held firmly in position by means of a set screw 4. The relative positions of this arm 5 and the gas jet 2 are such as to bring the arm in close contact with the blaze when the gas is lighted. This arm 5 is composed of two metals which expand and contract unequally when exposed to different degrees of temperature, and two metals which will successfully and satisfactorily accomplish the object of this invention are brass and Norway iron. The arm 5 being composed of the two metals mentioned brazed together, the brass 18 being placed next to the gas jet 2, accomplishes this purpose: When the temperature of this arm 5 is raised by the heat from the gas jet when the same is lighted, the portion of the arm composed of brass will expand much more than the portion composed of iron, causing the arm to bend in a direction away from the heat, and when the flame is extinguished the cooling of the arm 5 causes it to straighten back in its former position. In making use of this invention after the same is properly adjusted, the gas is turned on by means of the ordinary valve or shut off 30. Then the automatic valve is opened by pressing up on the thumb lift or button 17, which causes the openings through the pipe and the plunger 15 and 16 to correspond, as shown in Fig. 3, thus permitting the gas to flow through the pipe to the jet 2 where it is lighted in the ordinary manner, the automatic valve being held open by means of this thumb pressure a sufficient length of time to allow the arm 5 to become heated and bent as above described. The pressure on the thumb lift 17 raises the arm 6 to a position where the disengaged end thereof 28 is lifted above 31 the top end of the arm 5. When the gas is lighted the unequal expansion of the metals composing the arm 5, and the bending thereof as above set forth, causes the top end 31 to engage the end 28 of the arm 6, with the result that as long as the gas is burning and the arm 5 is kept heated, the automatic valve remains open; but when the gas is blown out the cooling of the arm 5 causes it to straighten back and out from under the end 28 of the arm 6, allowing the arm 6 to drop down and the spiral spring 12 to force the plunger 14 down until the opening through it 16 is brought below the opening 15 through the pipe, thus automatically closing the valve, as shown in Fig. 6. The arm 5 being made very thin, and brass being very sensitive to changes of temperature, it responds and bends quickly when heat is applied, and quickly straightens back when the heat is withdrawn. The gas is turned off by means of the ordinary valve 30, after which the cooling of the arm 5 closes the valve automatically.

I claim:

1. The combination in an automatic gas shut off of a metal gas pipe, an ordinary gas jet at one end, a screw thread at the other end, an automatic valve between the jet end and an ordinary valve or shut off, a plunger forming part of the automatic valve working in an opening through the pipe, a hole through the plunger corresponding with the hole lengthwise through the pipe, a spiral spring around the plunger resting on a shoulder and held in place by a cap screwed to a collar raised on the pipe and extending around the plunger, a thumb lift or button attached to the lower end of the plunger, a joint or hinge in the upper extension of the plunger, an arm hinged at one end to an upright made fast to the pipe and the other end unattached, a thin piece of metal composed of brass and Norway iron brazed together, made fast to the pipe in close proximity to the jet by means of a slot and set screw the other end being close to but not engaging the unattached end of the arm, all substantially as set forth.

2. In an automatic cut-off for gas burners, a thermostatic bar attached to the burner, a valve in the burner, a housing on the burner, a portion of the valve disposed within the housing, a stem on the outer end of the valve, said housing having an opening to permit the said stem to extend above the housing, a spring disposed between the housing and the valve for holding the valve normally downward in a closed position, a manually operated stem on the lower end of the valve whereby the valve may be lifted into open position, a standard on the burner, and an arm pivotally connected on the stem at approximately central portion, and pivotally connected to the standard, the free end of said arm being adapted for engagement with said thermostatic bar, whereby when the free end of the arm is engaged on the thermostatic bar, and heat from the burner acts on the thermostatic bar, said bar will move from under the end of said arm, and permit the valve to move into its normal closed position under the action of said spring.

ARZA R. TRACY.

Witnesses:
W. G. BEARD,
J. H. BUCHANAN.

Copies of this patent may be obtained for five cents each, by addressing the "Commissioner of Patents, Washington, D. C."